No. 710,893. Patented Oct. 7, 1902.
A. S. RAMAGE.
CHEMICAL COMPOUND TERPENE PEROXID.
(Application filed Jan. 21, 1901.)
(Specimens.)
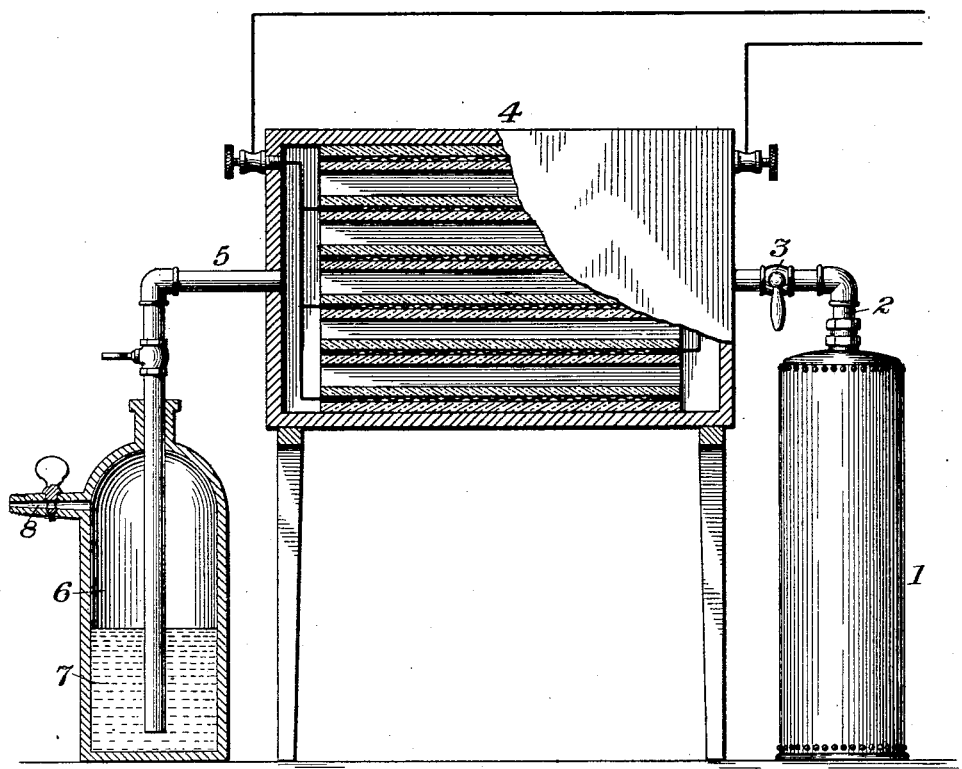
Witnesses:
R A Balderson
W. E. Neff
Inventor:
Alexander S. Ramage
By Byrnes & Townsend,
Attys.

UNITED STATES PATENT OFFICE.

ALEXANDER S. RAMAGE, OF CLEVELAND, OHIO.

CHEMICAL COMPOUND TERPENE PEROXID.

SPECIFICATION forming part of Letters Patent No. 710,893, dated October 7, 1902.

Application filed January 21, 1901. Serial No. 44,113. (Specimens.)

*To all whom it may concern:*

Be it known that I, ALEXANDER S. RAMAGE, a citizen of the United States, residing at Cleveland, Ohio, have invented a new and useful Chemical Compound Terpene Peroxid, of which the following is a specification.

I have discovered that when a terpene hydrocarbon is brought into contact with an oxidizing agent of sufficient chemical activity, especially ozone or ozonized air, in the absence of water the hydrocarbon is oxidized and fumes of terpene peroxid are evolved, which may be condensed into a liquid. The oxidizing agent may be brought into contact with the terpene hydrocarbon in different ways. One form of apparatus for effecting this result is shown in the accompanying drawing, in which the figure is an elevation, partly in section.

The apparatus shown comprises means for supplying oxygen or air to the ozonizer, here shown as a tank of compressed oxygen or air 1, having an outlet-pipe 2, with control-valve 3, leading to the ozonizer 4. The ozonizer (shown in section) may be of any usual construction, such as that of my United States Patent No. 614,500. An outlet-pipe 5 leads from the ozonizer into and nearly to the bottom of a vessel 6, within which is placed a body 7 of the terpene hydrocarbon to be oxidized, preferably oil of eucalyptus or its active constituent—eucalyptol or cineol. The vessel 6 is preferably heated to a temperature of about 60° centigrade during the operation, as by placing it in an oil-bath. As the ozone or ozonized air bubbles up through the hydrocarbon it carries with it dense white fumes of the terpene peroxid, which are then discharged from the vessel through outlet 8. The fumes of the terpene peroxid may be condensed into a liquid by reducing their temperature to about 0° centigrade. After ozonized air has been passed through the terpene hydrocarbon for some time the fumes of peroxid will cease to rise and a residue will be left in the vessel, constituting about fifty per cent. of the hydrocarbon introduced. This residue is a resinous mass, which may be utilized for the manufacture of varnish or converted into an antiseptic chewing-gum.

The new product is a difficult one to accurately analyze; but it consists, approximately, of carbon, 70.2 parts; hydrogen, 10.4 parts, and oxygen 19.4 parts. I consider its chemical formula to be $C_{10}H_{18}O_2$. The product is miscible with absolute alcohol and hydrocarbons; but when brought into contact with water it decomposes into a terpene and hydrogen peroxid. The product boils at about 160° centigrade and its melting-point is below −30° centigrade. The index of refraction is +14° 15′.

This terpene peroxid has remarkable antiseptic properties and is especially valuable for the treatment of diseases produced by microörganisms. As it is volatile at any temperature above freezing, it is well adapted for use in inhalers for the treatment of diseases of the throat and lungs. Diseased animal tissues and surfaces may be exposed to its action for an indefinite length of time without its occasioning any irritation or harmful effects, and it may be freely inhaled in advanced cases of tuberculosis. When the volatilized peroxid comes into contact with the diseased tissues, the moisture of the tissues causes the compound to split up, liberating hydrogen peroxid, which again splits up into nascent oxygen and water. The nascent oxygen destroys the microörganisms in the tissues and at the same time the tissues are coated with the residual terpene. After the tissues become thus covered with the terpene pure ozone may be directly applied to them without causing the irritation which customarily follows its use. The terpene peroxid may also be employed by spraying it into a room, thus charging the air with it. A patient may then remain in the room and breathe the atmosphere continuously without inconvenience.

The process for producing this new product is claimed in my companion application, Serial No. 44,112, filed January 21, 1901.

I claim—

The new chemical compound, terpene peroxid, having the approximate formula $C_{10}H_{18}O_2$, insoluble in but decomposing in the presence of water into terpene and hydrogen peroxid, and having a freezing-point of about 30° centigrade and a boiling-point of about 160° centigrade.

Signed by me at Cleveland, Ohio, this 3d day of January, 1901.

ALEXANDER S. RAMAGE.

Witnesses:
VICTOR C. LYNCH,
A. H. PARRATT.